(12) United States Patent
Roess et al.

(10) Patent No.: US 9,668,432 B2
(45) Date of Patent: Jun. 6, 2017

(54) SUBSURFACE IRRIGATION MAT

(71) Applicant: Hunter Industries, Inc., San Marcos, CA (US)

(72) Inventors: Thomas H. Roess, Twistringen (DE); Todd D. Polderman, San Marcos, CA (US); La Monte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 225 days.

(21) Appl. No.: 13/627,707

(22) Filed: Sep. 26, 2012

(65) Prior Publication Data

US 2013/0074400 A1    Mar. 28, 2013

Related U.S. Application Data

(63) Continuation-in-part of application No. 13/597,211, filed on Aug. 28, 2012.

(30) Foreign Application Priority Data

Sep. 26, 2011 (DE) .......................... 10 2011 114 238
Sep. 29, 2011 (DE) .......................... 10 2011 083 742
Oct. 13, 2011 (DE) .......................... 10 2011 084 468

(51) Int. Cl.
 *A01G 25/00* (2006.01)
 *A01G 25/06* (2006.01)

(52) U.S. Cl.
 CPC .................................. *A01G 25/06* (2013.01)

(58) Field of Classification Search
 CPC ...... A01G 25/00; A01G 25/02; A01G 25/023; A01G 25/06; A01G 13/0281; A01G 29/00
 (Continued)

(56) References Cited

U.S. PATENT DOCUMENTS 1,389,319 A    8/1921 Quigley
3,205,619 A    9/1965 Henry
(Continued)

FOREIGN PATENT DOCUMENTS

AU    627697    3/1989
CH    542571    10/1973
(Continued)

OTHER PUBLICATIONS

Written Opinion from PCT Counterpart Patent Application No. PCT/EP2012/068929 to U.S. Appl. No. 13/597,211 (parent to subject CIP patent application).
(Continued)

*Primary Examiner* — Trinh Nguyen
(74) *Attorney, Agent, or Firm* — Knobbe Martens Olson & Bear, LLP

(57) ABSTRACT

A subsurface irrigation mat includes at least one perforated tube, a web made of a first capillary textile, and a casing made of a second capillary textile. The casing surrounds substantially an entire circumference of the perforated tube along at least a portion of a length of the tube. At least one attachment secures the casing to the web so that the casing extends across the web. Water leaving through the holes in the perforated tube can saturate the casing, seep into the web from the casing, and then be carried across the web by capillary action. The result is a substantially uniform discharge of water from the web into a root zone of plants growing in a layer of a growing medium located above the web.

17 Claims, 7 Drawing Sheets

(58) Field of Classification Search
USPC .... 47/48.5, 79, 21.1, 9, 62 E; 239/145, 450; 405/45, 36, 43; 442/381, 387
See application file for complete search history.

(56) References Cited

U.S. PATENT DOCUMENTS

| | | | |
|---|---|---|---|
| 3,361,359 A | 1/1968 | Chapin | |
| 3,946,752 A | 3/1976 | Yamamoto | 138/140 |
| 3,946,762 A | 3/1976 | Green | |
| 4,062,306 A | 12/1977 | Wosmek | |
| 5,246,164 A | 9/1993 | McCann et al. | |
| 5,263,791 A | 11/1993 | Zeman | |
| 5,839,659 A | 11/1998 | Murray | 239/1 |
| 5,938,372 A | 8/1999 | Lichfield | |
| 6,161,776 A | 12/2000 | Byles | |
| 6,996,932 B2 | 2/2006 | Kruer et al. | |
| 7,392,614 B2 | 7/2008 | Kruer et al. | 47/48.5 |
| 7,647,724 B2 | 1/2010 | Caron et al. | 47/1.01 |
| 8,770,888 B2 | 7/2014 | Helbig et al. | |
| 2006/0201061 A1 | 9/2006 | Caron et al. | 47/79 |
| 2008/0271366 A1 | 11/2008 | Thompson et al. | |
| 2008/0282609 A1* | 11/2008 | Nelson | A01G 13/0268 47/48.5 |
| 2009/0134242 A1 | 5/2009 | Theoret et al. | 239/201 |
| 2010/0251612 A1* | 10/2010 | Gesser et al. | 47/62 R |
| 2010/0282859 A1 | 11/2010 | Helbig et al. | 239/11 |
| 2012/0111972 A1 | 5/2012 | Theoret et al. | 239/201 |

FOREIGN PATENT DOCUMENTS

| | | | |
|---|---|---|---|
| DE | 2610384 | 9/1976 | |
| DE | 3041534 | 6/1982 | |
| DE | 10118643 | 10/2002 | |
| EP | 18234 | 10/1980 | |
| EP | 155143 | 9/1985 | |
| EP | 1 430 770 A1 | 6/2004 | A01G 13/02 |
| EP | 0969151 B1 | 7/2004 | |
| FR | 2323317 | 4/1977 | |
| FR | 2331953 A2 | 6/1977 | |
| FR | 2387582 | 11/1978 | |
| FR | 2473262 | 7/1981 | |
| WO | WO 2009/015911 A2 | 5/2009 | A01G 25/06 |

OTHER PUBLICATIONS

KISSS Sub-Surface Textile Irrigation, as shown in "Toro Irrigation, KISSS Sub-Surface Textile Irrigation Brochure," was for sale in Australia by at least early 2010 and at least one year prior to the filing of the priority applications of the present application.

German Patent Office Examination Report from German Counterpart Patent Application No. 10 2011 083 742.6 (4 pages ) to U.S. Appl. No. 13/597,211 (parent to subject CIP patent application).

* cited by examiner

SUBSURFACE IRRIGATION MAT

CROSS-REFERENCE TO RELATED APPLICATIONS

This application is a continuation-in-part of U.S. patent application Ser. No. 13/597,211, filed Aug. 28, 2012, by Thomas Roes and Todd Polderman entitled "Irrigation Mat." Priority based on the filing date of the aforementioned pending U.S. Ser. No. 13/597,211 patent application is hereby claimed, the entire disclosure of which is hereby incorporated by reference. This application also claims priority based on the filing dates of three German Patent Applications: No. DE 10 2011 114 238.3 filed 26 Sep. 2011; No. DE 10 2011 083 742.6 filed 29 Sep. 2011; and No. DE 10 2011 084 468.6 filed 13 Oct. 2011.

FIELD OF THE INVENTION

The present invention relates to devices for irrigating turf and other landscaping.

BACKGROUND OF THE INVENTION

Most residential, commercial, golf and athletic field irrigation sites are watered with sprinklers which distribute the water above the ground. The sprinklers are typically coupled to solenoid actuated valves via underground pipes. The valves are turned ON and OFF by a programmable electronic irrigation controller which executes a watering program. Large areas of turf are watered with gear driven rotor-type sprinklers. Smaller areas of turf, as well as shrubs and other decorative plantings, are watered with rotary stream sprinklers and spray-type sprinklers. Drip irrigation and micro-spray nozzles can also be used to water individual plants with very low flow rates in an effort to conserve water.

Some landscaped areas can benefit from the subterranean application of water, such as grassy areas that have inclined or hilly contours or roof top gardens on high rise buildings. If these contoured areas are watered with sprinklers, a substantial amount of water can run-off the contoured areas or spray onto undesired areas such as walkways. In some areas, the ambient temperature is so high that a substantial amount of water applied via sprinklers to turf and other landscaping is lost due to evaporation. In the case of roof-top gardens, the winds can be substantial and a significant proportion of water from above-ground sprinklers can be blown away. Spikes with built-in nozzles can be used to deliver water underground, but this is only appropriate for individual trees and shrubs, and not turf.

An "irrigation mat" has been developed that is designed to be buried in the soil below turf and other landscaping delivers water to this type of vegetation in a subsurface fashion. This allows watering of contoured landscaped areas and roof top gardens without loss of water due to spraying sidewalks, excess run off or blowing wind. Golf courses, playing fields and the like can be in use by players during subsurface watering. Subsurface watering is also more efficient in conserving water since it eliminates surface water evaporation. One form of irrigation mat that has been commercialized comprises a plurality of parallel extending perforated plastic pipes that are surrounded by a textile mat that conducts water away from the pipes into the soil via capillary action. This type of irrigation mat is typically buried four to six inches below turf or other plantings. See U.S. Pat. No. 5,839,659 of Murray granted Nov. 24, 1998, entitled "Capillary Root Zone Irrigation System."

There is a need for improved forms of irrigation mat that are useful in the aforementioned specialized irrigation sites, and others.

SUMMARY OF THE INVENTION

In accordance with the present invention an improved subsurface irrigation mat includes at least one perforated tube, a web made of a first capillary textile, and a casing made of a second capillary textile. The casing surrounds substantially an entire circumference of the perforated tube along at least a portion of a length of the tube. The casing is not formed as a pocket by laminating a portion of the second capillary textile with the first capillary textile as in a prior design. At least one attachment secures the casing to the web so that the casing extends across the web. A fiber size and a density of the first and second capillary textiles, and a size and spacing of a plurality of holes in the perforated tube are selected for optimum performance. Water leaving through the holes in the perforated tube can saturate the casing, seep into the web from the casing, and then be carried across the web by capillary action. The result is a substantially uniform discharge of water from the web into a root zone of plants growing in a layer of a growing medium located above the web.

DETAILED DESCRIPTION

Figure 1:
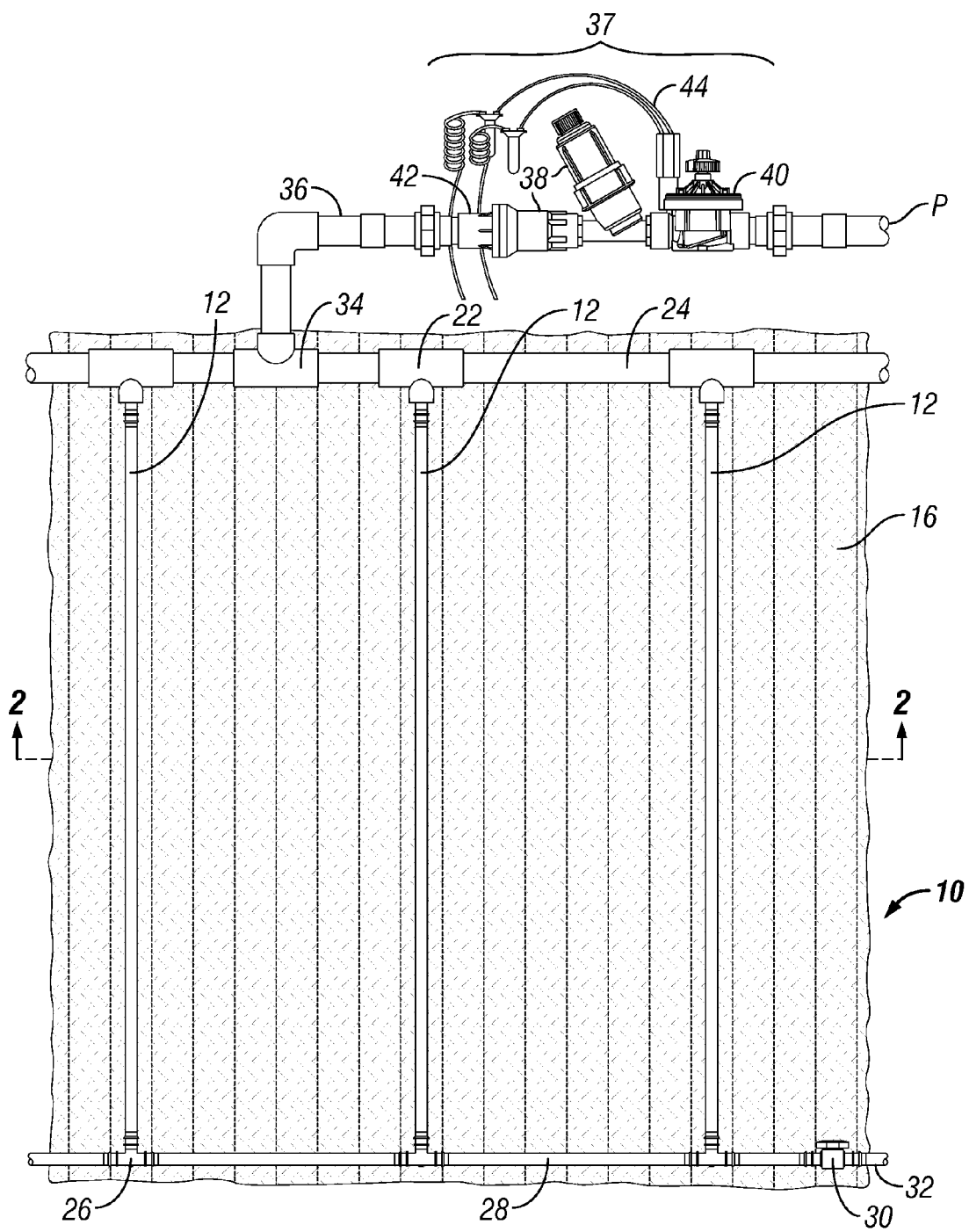
FIG. 1 is a fragmentary diagrammatic plan view illustrating a section of a subsurface irrigation mat and associated plumbing.

Referring to FIG. 1, in accordance with an embodiment of the present invention an improved subsurface irrigation mat 10 includes a plurality of perforated tubes in the form of drip lines 12 that extend in parallel, spaced apart fashion. The drip lines 12 contain emitters that regulate and limit the flow of water through associated holes in the tubes. By way of example, the drip lines 12 may be located at equally spaced intervals, such as thirty centimeters to sixty centimeters (approximately one to two feet) apart. Each drip line 12 is surrounded substantially along its entire length by a generally cylindrical jacket or casing 14 (FIGS. 2 and 4) made of a first capillary textile preferably in the form of non-woven polymer fleece material. The fleece casings 14 are in turn secured via adhesive 15 (FIG. 4) to the top of a continuous mat or web 16 (FIGS. 1 and 4) made of a second capillary textile, also preferably a non-woven polymer fleece material. The adhesive 15 functions as an attachment to hold the casing 14 and the drip line 12 surrounded by the casing 14 in position on the web 16. The adhesive 15 may be applied as a continuous bead, applied as stripes spaced apart at intervals, or applied as spaced apart spots. Alternatively, sonic welding in spots could be used to form the attachment between the casing 14 and the web 16.

Importantly, the fleece casings 14 are not formed as pockets by laminating a portion of the first capillary textile with the second capillary textile as disclosed in the aforementioned U.S. Pat. No. 5,839,659 of Murray. The wrapped casing 14 is saturated with water from the drip line 12 via the capillary action and then more evenly distributes that water to the mat 16, thereby reducing heavy water saturation of the soil near the emitters of the drip line 12. This produces more even distribution of water in the mat 16, thereby maximizing the efficiency of the irrigation process.

Figure 2:
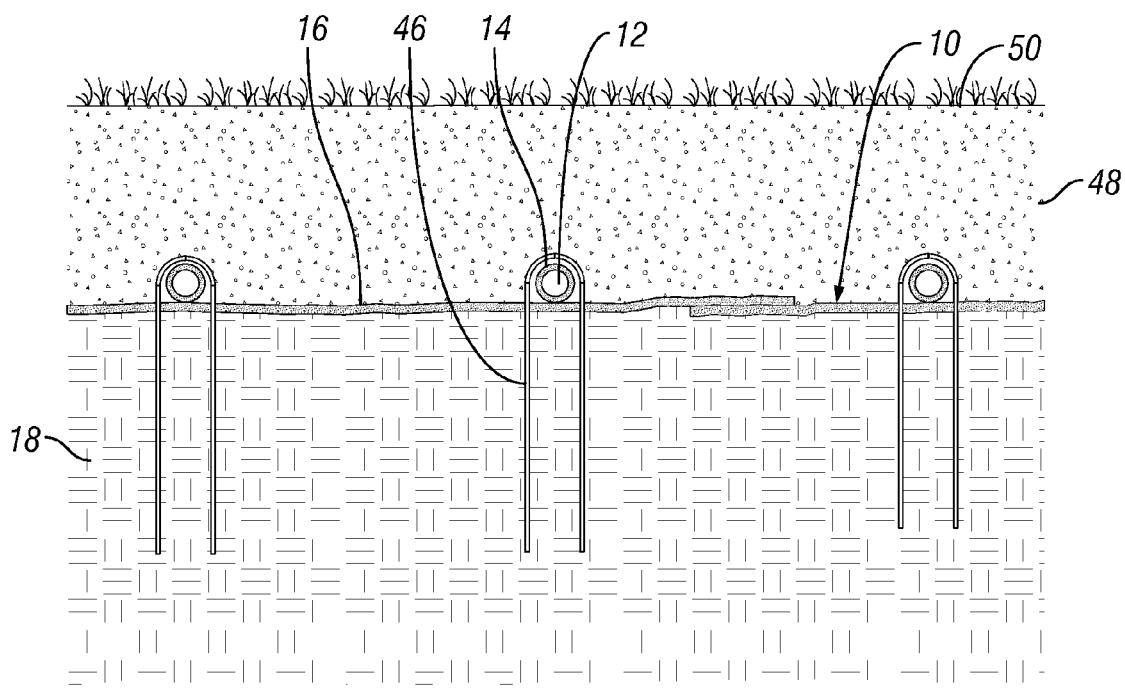
FIG. 2 is a fragmentary diagrammatic vertical sectional view taken along line 2-2 of FIG. 1 illustrating the installation of the subsurface irrigation mat on top of the site soil and beneath a layer of amended soil that is covered with sod.

The irrigation mat 10 is laid over the top of the site soil 18 (FIG. 2). In some applications, the irrigation mat 10 may be laid directly over other materials such as concrete, crushed rock, roofing membrane, or other engineered materials specific to the site. One set of ends of the drip lines 12 are connected to corresponding polyvinyl chloride (PVC) T-fittings 22 (FIG. 1) adhesively secured to segments of PVC pipe that form a water supply lateral line or header 24. The other set of ends of the drip lines 12 are connected to corresponding plastic barbed T-fitting assemblies 26 (FIG. 1) that connect segments of tubing that form a lateral discharge header 28. The discharge header 28 is connected to a barbed manual shut-off/flush valve 30 that permits selective discharge through a discharge tube 32. During installation, the valve 30 can be opened to flush dirt and other debris that may have entered the drip lines 12 and various fittings to prevent clogging of the emitters in the drip line 12.

The water supply header 24 (FIG. 1) is coupled through a PVC T-fitting 34, through suitable PVC couplings 36 to a drip zone control kit 37 that includes a Y-shaped filter 38, a solenoid actuated ON/OFF valve 40 and a pressure regulator 42. Suitable drip zone control kits are commercially available from Hunter Industries, Inc., the assignee of the subject application, under product Nos ICZ-101, PACZ-075, and PCZ-101. The solenoid actuated valve 40 is connected via wires 44 to an electronic irrigation controller (not illustrated) such as the I-CORE® irrigation controller manufactured and sold by Hunter Industries, Inc.

A plurality of U-shaped sod stakes 46 (FIG. 2) are installed approximately eight feet apart on center over the drip lines 12 and are driven into the site soil 18 in order to anchor the irrigation mat 10 in place. A layer of material 48 is spread over the irrigation mat 10. The material 48 may take the form of a growing medium or amended soil, preferably having a depth D of approximately ten centimeters to fifteen centimeters (approximately four to six inches) in a non-green roof application. Plants are planted in the layer of growing medium 48. In the illustrated example, the plants are in the form of turf or sod 50 that has been laid over the top of the growing medium 48. The growing medium 48 may include engineered materials, sand, open cell foam, or any other materials suitable for growing plants.

One example of suitable drip line 12 that may be used in the irrigation mat 10 is the PLD™ drip line manufactured and sold by Hunter Industries, Inc. The PLD drip line comprises flexible, deformable black plastic hose or tubing that includes in-line pressure compensating, non-draining, molded plastic cylindrical-shaped emitters that are installed in the plastic tubing at twelve inch, eighteen inch or twenty-four inch intervals. The emitters ensure uniform water delivery along the length of the tubing regardless of changes in elevation. The holes in the wall of the tubing through which the water is emitted preferably have a diameter in the range of between about two millimeters to about three millimeters. The PLD drip line includes a built-in check valve that prevents emitter clogging and wasteful run-off. The nominal operating pressure range of the PLD drip line is approximately fifteen pounds per square inch (PSI) to approximately fifty PSI. The emitters preferably take the form of injection molded plastic cylinders. They are molded with tortuous water paths that are dimensioned and configured to allow water to be emitted through aligned holes or perforations in the plastic tubing at relatively low flow rates of 0.4, 0.6, or 1.0 gallons per hour (GPH) when water is supplied to the PLD drip line in the nominal pressure range.

The recommended filtration for the PLD drip line to prevent clogging in the emitters is in the range of between approximately one hundred mesh to approximately one hundred and fifty mesh (100-150 Mesh). The plastic tubing of the PLD drip line is made of a suitable plastic with an inside diameter (ID) dimensioned to allow the tubing to readily flare to accept and hold seventeen millimeter barbed fittings. While the plastic tubing of the PLD drip line is normally made with a UV resistant plastic, the UV resistant additives may be left out of the plastic from which the tubing is formed when the PLD drip line is used in the irrigation mat described herein. This is because the plastic tubing is wrapped with polymer fleece material and buried in the ground, and therefore, the tubing is not exposed to the UV radiation from the Sun which would otherwise degrade the non-UV resistant plastic.

The irrigation controller turns the solenoid actuated valve 40 ON and OFF in accordance with a pre-programmed watering schedule to deliver water from a pressurized source P (FIG. 1), such as a municipal water supply or a well, through the drip zone control kit 37 to the water supply header 24. Water is then delivered from the supply header 24 through the drip lines 12. Water is slowly emitted from the perforated drip lines 12 and is first soaked up by the fleece casings 14 and spread along the length of the casings 14 via capillary action. The fleece casings 14 eventually become saturated with water and water is then conveyed from the fleece casings 14 in into substantially the entire area of the fleece web 16 through capillary action. Excess water eventually leaves the fleece web 16 over its entire upper surface area and is evenly dispersed throughout the root zone of the layer of amended soil 48 (FIG. 2). The roots of the grass plants that form the layer of sod 50 penetrate the layer of moist amended soil 48 so that the roots can absorb water to maintain the health of the sod 50. This type of irrigation eliminates the evaporation often associated with overhead watering where some portion of the water may be lost into the atmosphere before it is able to soak into the soil.

In the preferred embodiment of the present invention, each square yard of the subsurface irrigation mat 10 can hold up to one gallon of water. The relatively large fleece web 16 functions as a water reservoir that ensures that water is uniformly absorbed into the root zone across its entire area. Since the subsurface irrigation mat 10 underlies the entire root area of the sod 50, the capillary effect of the amended soil 48 is less of a factor in proper water distribution. Because water is never on the surface of the sod 50 due to irrigation, high traffic areas in places like amusement parks, city parks, sports fields, and commercial complexes can be used all day long without the need to budget time for overhead irrigation. This method also eliminates the worry about vandalism to irrigation sprinklers.

Figure 3:
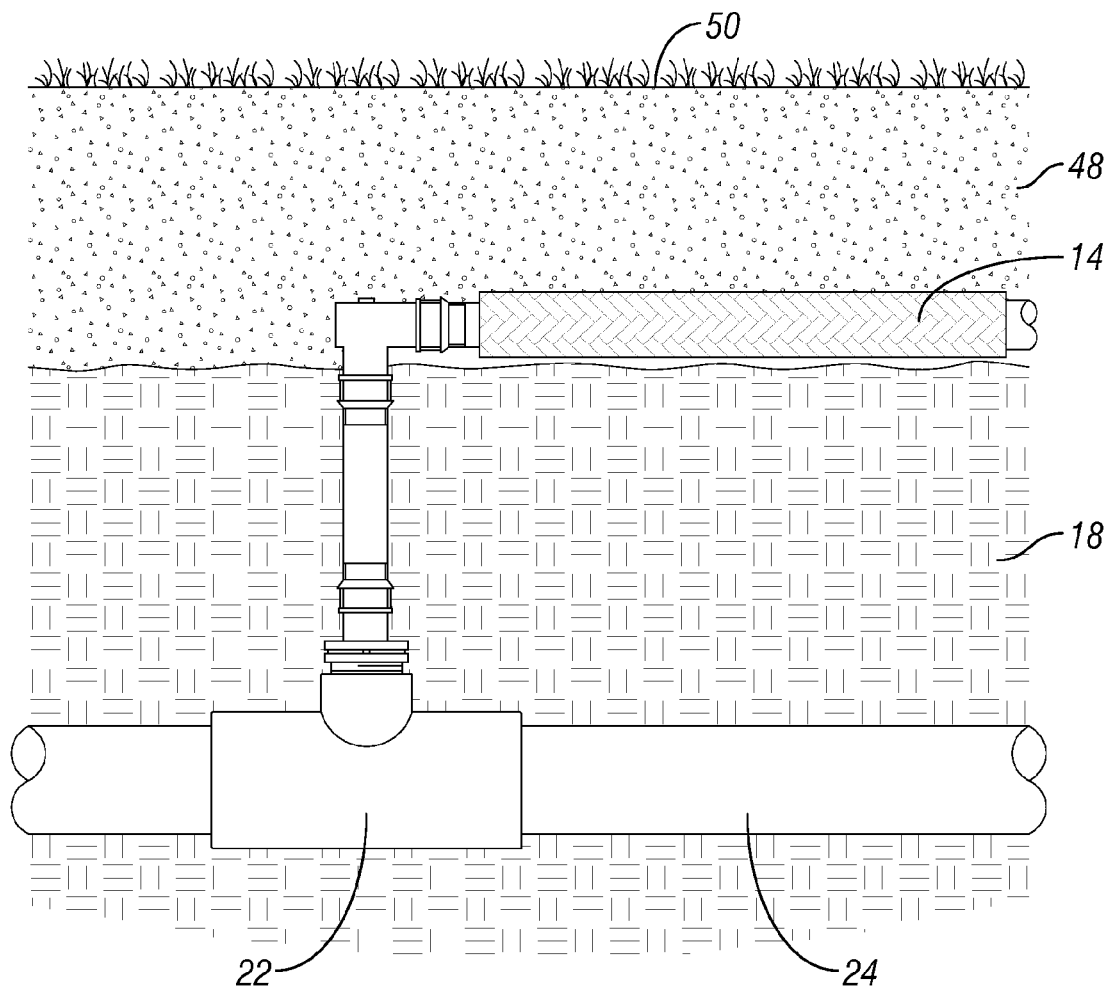
FIG. 3 is a fragmentary diagrammatic vertical sectional view illustrating the connection of a perforated tube and casing to a PVC supply header.

The shape of the subsurface irrigation mat 10 can be customized to fit any area, even the oddest shaped landscape designs. To add flexibility in the installation and to accommodate very narrow strips, the perforated tubing 12 wrapped in the casing 14 may be installed in the soil as illustrated in FIG. 3 without the mat 16. The most compact rooftops can be used to grow healthy plants and grass using the subsurface irrigation mat 10. Irrigation with the subsurface irrigation mat 10 does not suffer from loss of water due to wind, run off or evaporation, and thus, many irrigation sites will benefit from substantial water savings compared to traditional overhead irrigation. In the irrigation mat 10 of the present invention, the fleece casings 14 that surround the drip lines 12 help reduce root intrusion into the emitters of the drip lines 12. Fertilizers and herbicides can be advantageously delivered to the root zone via the irrigation mat 10. The use of a fully wrapped casing 14 and a single web 16 produces a more even distribution of water from the drip tubing 12 to the mat 16, thereby increasing the efficiency of the irrigation process and the saving of water as compared to the aforementioned U.S. Pat. No. 5,839,659 of Murray.

The term "non-woven" means that the textiles from which the casings 14 and the web 16 are made are not manufactured from yarn that is knitted or woven into a continuous pattern. Instead, the non-woven textiles are made of randomly oriented segments or fibers of polymer material preferably including recycled non-carbonated and carbonated beverage bottles made primarily of polyethylene terephthalate (PET). By way of example, not by way of limitation, the casings 14 and the web 16 can be made of Fibertex F-250 Extra polymer non-woven fleece material commercially available from Fibertex Non-wovens A/A, Svendborgvej 16, DK-9220 Aaalbord, Denmark. See www-.fibertex.com. This polymer fleece material is made of a mixture of polypropylene (PP), PET and polyacrylate (PAC) needled fibers. The Fibertex polymer fleece material has a weight of approximately two hundred and fifty grams per square meter, and a water capacity of approximately 1.7 liters per square meter. The Fibertex polymer fleece material has a capillary lift of 2.5 centimeters in five minutes, 3.0 centimeters in one hour, and 3.5 centimeters in twenty-four hours. Suitable non-woven polymer fleece textile materials are also commercially available from U.S. Fabrics, Inc., 1904 Virginia Avenue, Cincinnati, Ohio 45227 U.S.A., and other companies.

Figure 5:
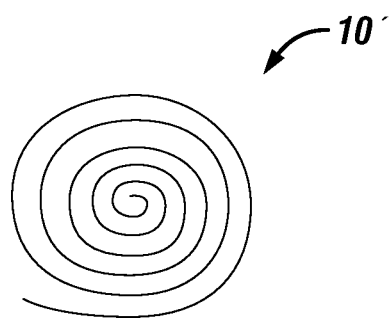
FIG. 5 is a diagrammatic end elevation view of a roll of the irrigation mat of FIG. 1.

The irrigation mat 10 is relatively lightweight and has a predetermined thickness and flexibility so that it is capable of being rolled up on itself. The rolled configuration of the irrigation mat 10' as illustrated diagrammatically in FIG. 5 is relatively compact, and therefore, facilitates shipping to the irrigation site. It also facilitates installation in that the rolled configuration of the subsurface irrigation mat 10' can be placed at a desired location on the irrigation site and unrolled.

During installation at the irrigation site, the irrigation mat 10 unrolls from the roll 10' into a long strip approximately eighty centimeters wide and one hundred meters in length providing approximately eighty square meters of coverage. The irrigation mat 10 may have drip lines 12 extending in parallel relationship and spaced approximately thirty-five centimeters apart. The drip lines 12 may have a nominal outside diameter of approximately sixteen millimeters and have in-line pressure compensating emitters longitudinally spaced apart at thirty centimeter intervals. These emitters may have a drip rate of approximately 2.2 liters per hour at water pressures of between about fifteen PSI and about fifty PSI. The drip lines 12 further include built-in check valves to prevent emitter clogging and wasteful run off.

The irrigation mat 10 could also be manufactured as a relatively narrow strip (not illustrated), with only a single drip line 12. Multiple narrow irrigation mats could be laid side-by-side with their opposing side edges closely adjacent or overlapping, depending on the irrigation requirements of the site. Other textiles besides non-woven PET fleece may be used to form the casings 14 and the web 16. These components may be made of non-woven textiles made of randomly oriented polypropylene or polyethylene fibers, or fibers made of a blend of polypropylene and polyethylene.

The construction of the irrigation mat 10 can be varied to suit the particular irrigation site application and/or to reduce manufacturing costs and/or increase reliability. Some of these constructions are disclosed in the aforementioned U.S. patent application Ser. No. 13/597,211 referred to above. Still others are described hereafter.

Figure 6:
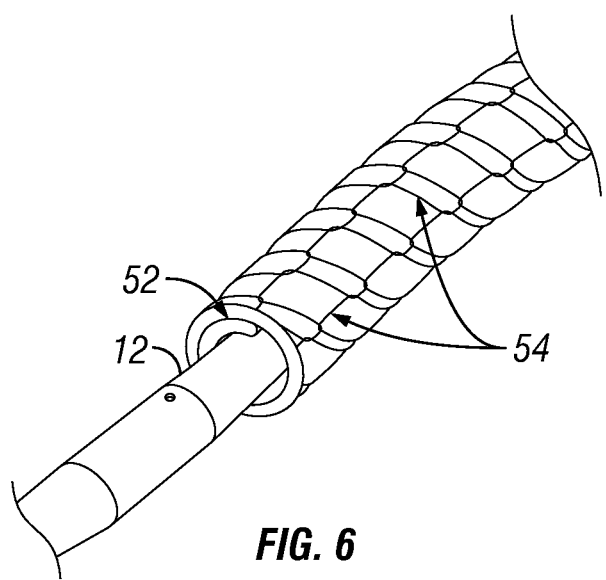
FIG. 6 is a fragmentary isometric view of a wrapped perforated tube that uses helical stitching to secure the wrapped casing around the perforated tube.

Referring to FIG. 6, the casing that surrounds the drip line 12 can take the form of an overwrap 52 of non-woven PET fleece material surrounded by interlocking helical thread stitching 54. The longitudinal edges of the overwrap 52 overlap one another. The overwrap 52 is made of a single long rectangular shaped piece of non-woven fleece material. The location of one of the cylindrical emitters and its associated hole in the drip line 12 are both visible in FIG. 6.

Figure 7:
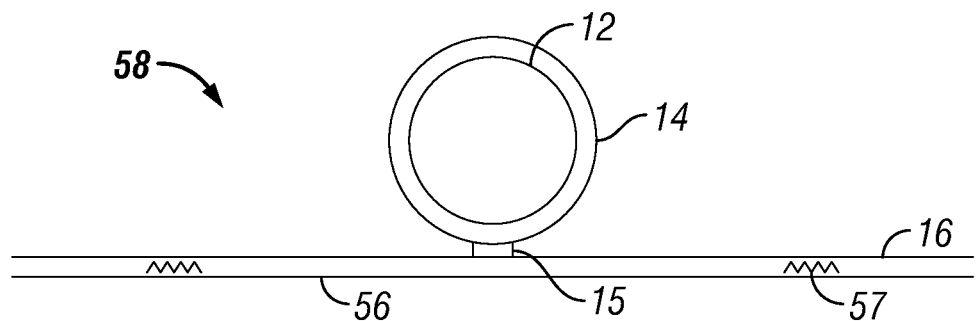
FIGS. 7-14 are diagrammatic vertical cross-sectional views of various alternative embodiments of the irrigation mat.

Referring to FIG. 7, a web 56 of water impervious material may be adhered via adhesive 57 to the lower surface of the web 16 to reduce water absorption of the soil below the web 16. This will encourage additional holding of water in the irrigation mat 58 and increase its function as a reservoir of water for continuous supply of water to the plants in the growing medium 48 above the irrigation mat 58. For example, a thin layer of water impermeable material, such as synthetic rubber, could be bonded to the underside of the web 16 with rubber cement to ensure that water distributed therefrom moves upwardly into the root zone, and not downwardly where it would have no beneficial effect for the plants growing above the irrigation mat 58. Alternatively the lower surface of the web 16 may be calendared, i.e. heated and melted via infrared radiation, ultrasonic vibration, or other suitable heating method to form a substantially water impervious web 56.

Figure 8:
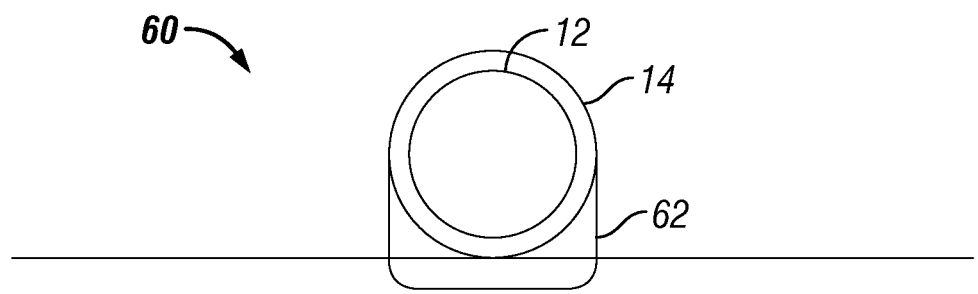

Referring to FIG. 8, in an alternate embodiment of the irrigation mat 60 an alternate attachment means takes the form of stitching 62 that crosses over the top of the casing 14 and passes through the web 16 to secure the wrapped drip line 12 in position. Care must be taken during the application of the stitching 62 so as not to puncture the drip line 12.

Figure 9:
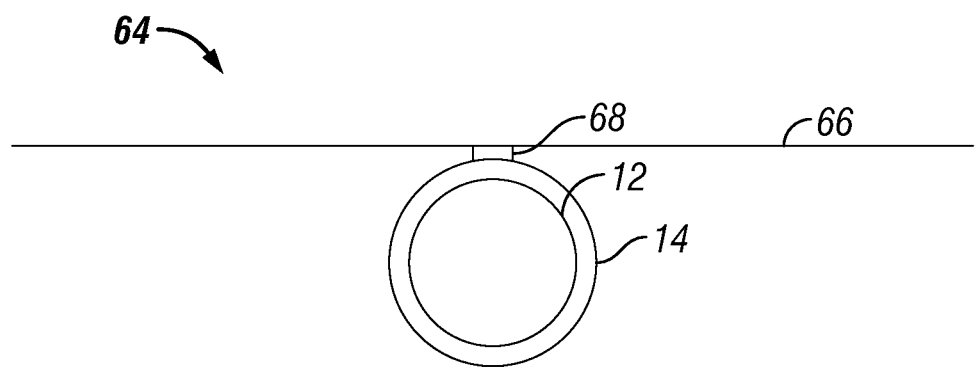

Referring to FIG. 9, in another alternate embodiment of the irrigation mat 64 a web 66 of a non-woven polymer fleece material is secured to the casing 14 above the drip line tubing 12 via adhesive 68.

Figure 4:
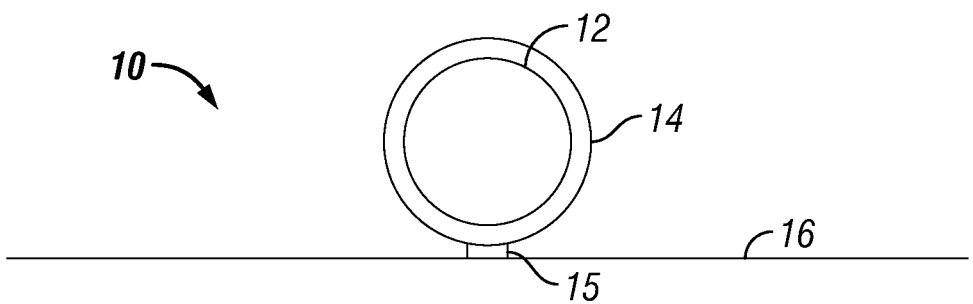
FIG. 4 is a diagrammatic vertical cross-sectional view of the irrigation mat of FIG. 1 taken through one of its drip lines.
Figure 10:
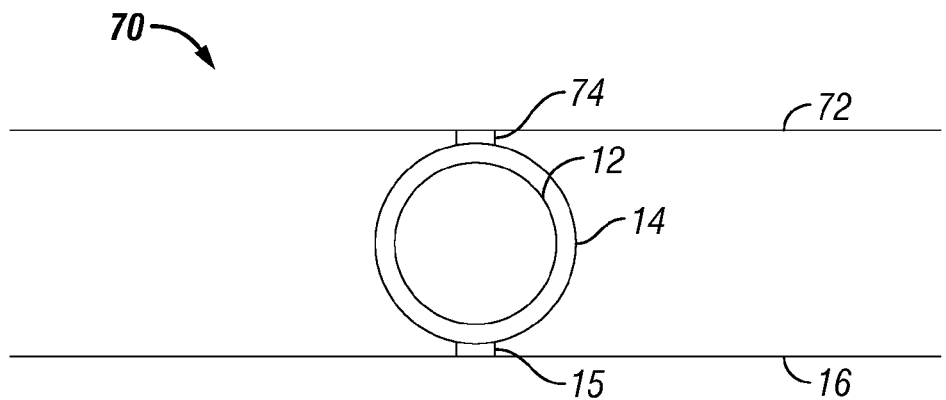

Referring to FIG. 10, in yet another alternate embodiment of the irrigation mat 70, the web 16 is secured to the casing 14 below the drip line tubing 12 via adhesive 15 as in FIG. 4. In addition, a second web 72 of a non-woven polymer fleece material is secured to the casing 14 above the drip line tubing 12 via adhesive 74. The web 72 could also be secured to the top of the casing 14 with stitching or mechanical fasteners instead of using the adhesive 74.

Figure 11:
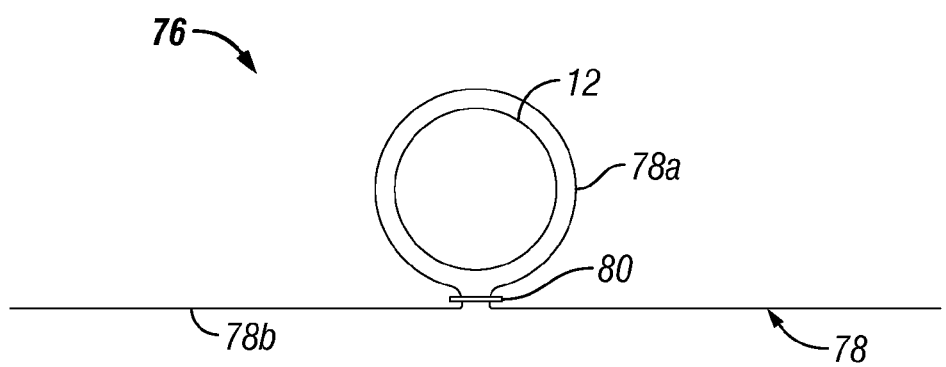

Referring to FIG. 11, in another alternate embodiment of the irrigation mat 76 a single web 78 of non-woven polymer fleece material forms the casing 78a and the dispersal web 78b by use of a single row of stitching 80. The casing 78a and the dispersal web 78b are thus made from a single continuous sheet of textile material that has been wrapped around the drip line 12 and joined in a seam adjacent the drip line 12. This construction defines laterally extending portions on opposite sides of the drip line 12.

Figure 12:
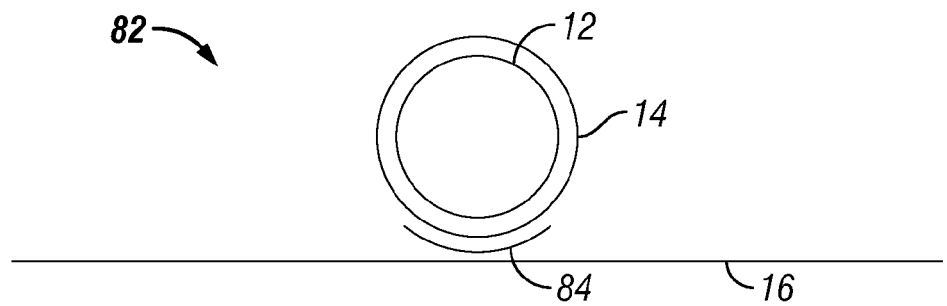

Referring to FIG. 12, in another alternate embodiment of the irrigation mat 82 a strip of two-sided adhesive tape 84 is used as the attachment that secures the casing 14 to the web 16. The tape 82 may extend the full length of the casing 14 or may be applied in strips with suitably sized intervals.

Figure 13:
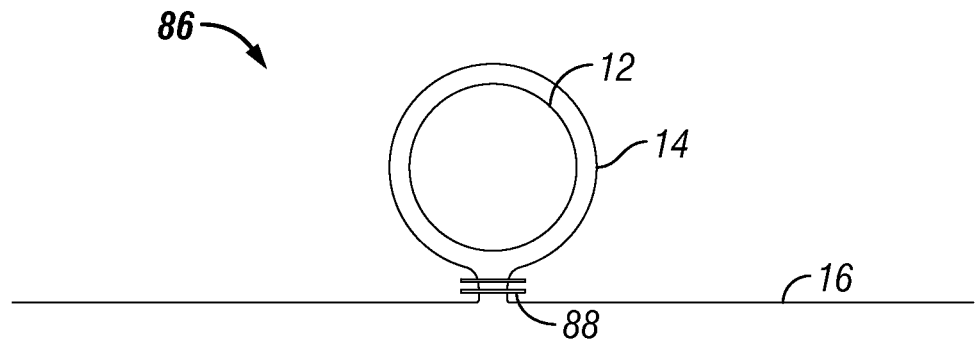

Referring to FIG. 13, in another alternate embodiment of the irrigation mat 86 the attachment that secures the casing 14 to the web 16 comprises a plurality of mechanical fasteners 88, such as staples, rivets, snaps, ties, etc. Preferably, the mechanical fasteners 88 are made of a metal that will not oxidize in the wet environment. The mechanical fasteners 88 can also be made of plastic of suitable strength. The casing 14 and 16 may be made from separate pieces of non-woven polymer fleece material or they may be made of a single piece of this type of fabric folded and fastened together to produce the configuration illustrated in FIG. 13.

Figure 14:
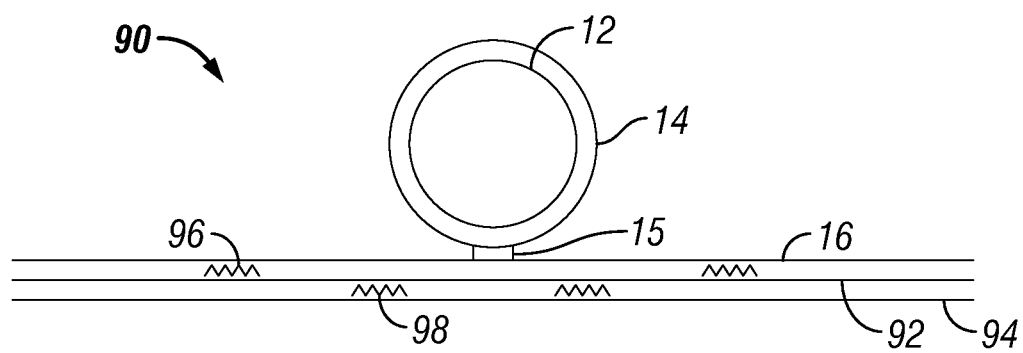

Referring to FIG. 14, in another alternate embodiment of the irrigation mat 90 additional webs 92 and 94 of non-woven polymer fleece material without any drip line are laminated to the underside of the web 16 with adhesive 96 and 98. This increases the reservoir holding capacity of the irrigation mat 90 beyond that of the irrigation mat 10. The configuration illustrated in FIG. 14 is useful in high drainage soils such as those that include a high percentage of sand.

While we have described and illustrated various embodiments of a subsurface irrigation mat, modifications and adaptation thereof will occur to persons skilled in the art. For example, the casings 14 and the web 16 need not be made out of the same textile material. One or both of these components could be made of a woven textile material some of which are marketed as "geotextiles" and "geosynthetics." However, where fibers in a woven textile material cross at right angles, lateral dispersion of water may be impaired. The casings 14 could be replaced with fleece wicking members each sandwiched between the lower portion of the circumference of the corresponding drip line 14 and the upper surface of the web 16. The drip lines 12 may have a flattened tubular configuration sometimes referred to as drip tapes. As used herein, the term "perforated tube" includes drip tubes, drip lines and drip tapes. It also includes drip lines comprised of un-perforated segments of tube connected between emitters that have holes or orifices for discharging water. When additional layers of textile material are adhered to the web 16, the web 56 of water impervious material may be adhered to the lowest layer of textile material. The irrigation mat of the present invention may be used in agricultural applications, in addition to residential, commercial, golf and athletic field irrigation applications. The casing 14, web 16 and/or stitching 54 could be impregnated with an herbicide to impede root intrusion. One suitable herbicide is Trifloraine. The configuration of the emitters can be varied or they can be eliminated completely. Therefore, the protection afforded our invention should only be limited in accordance with the following claims.

We claim:

1. A subsurface irrigation mat, comprising:
   at least one perforated tube;
   only one web made of a first capillary textile;
   a casing made of a second capillary textile surrounding substantially an entire circumference of the perforated tube along at least a portion of a length of the tube;
   at least one attachment positioned between the casing and the web securing the casing to the web so that the casing extends across the web; and
   wherein water leaving through the holes in to the perforated tube can saturate the casing, seep into the web from the casing, and then be carried across the web by capillary action for substantially uniform discharge from the web into a root zone of plants growing in a layer of a growing medium located above the web.

2. The irrigation mat of claim 1 wherein at least one of the first and second capillary textiles is made of a non-woven fleece material.

3. The irrigation mat of claim 2 wherein the non-woven fleece material is made of polyethylene terephthalate (PET).

4. The irrigation mat of claim 1 wherein the attachment is selected from the group consisting of adhesive, stitching, thermal bonding, sonic welding, mechanical fasteners, and stakes.

5. The irrigation mat of claim 1 wherein the at least one perforated tube comprises a plurality of tubes that extend across the web in substantially parallel spaced apart fashion.

6. The irrigation mat of claim 1 wherein the perforated tube comprises drip line that includes a plurality of emitters located at predetermined longitudinal intervals that communicate with corresponding holes in the perforated tube.

7. The irrigation mat of claim 1 and further comprising a layer of a substantially water impervious material adhered to an underside of the web for limiting an amount of water that is discharged into a layer of site soil below the irrigation mat.

8. The irrigation mat of claim 1 wherein the first and second capillary textiles are made of the same material.

9. The irrigation mat of claim 1 wherein the first and second capillary textiles are made from a material selected from the group consisting of polyethylene, polypropylene, a mixture of polyethylene and polypropylene, and polyethylene terephthalate (PET).

10. The irrigation mat of claim 1 where the web forms a water holding reservoir.

11. The irrigation mat of claim 10 and further comprising a second layer of a capillary textile adhered to an underside of the web for increasing a water holding capacity of the irrigation mat.

12. A subsurface irrigation mat, comprising:
   a plurality of perforated tubes;
   a plurality of emitters located at longitudinally spaced intervals within the tubes, each emitter limiting the flow of water through an associated hole in one of the tubes;
   not more than one web made of a non-woven polymer fleece material;
   a plurality of casings, each casing made of the non-woven polymer fleece material and surrounding substantially an entire circumference of a corresponding one of the perforated tubes along at least a portion of a length of the corresponding tube; and
   at least one attachment at an interface between the plurality of casings and the web and securing each casing to the web so that the casing extends across the web and so that the tubes extend in a spaced apart fashion.

13. The irrigation mat of claim 12 wherein the attachment is selected from the group consisting of adhesive, stitching, thermal bonding, sonic welding, mechanical fasteners, and stakes.

14. The irrigation mat of claim 1, wherein the at least one perforated tube is positioned entirely above or entirely below the entire web when the irrigation mat is installed.

15. The irrigation mate of claim 12, wherein each of the plurality of perforated tubes is positioned entirely above or entirely below the entire web when the irrigation mat is installed.

16. A subsurface irrigation mat comprising:
one or more of perforated tubes;
a plurality of emitters located at longitudinally spaced intervals within the tubes, each emitter limiting the flow of water through an associated hole in one of the tubes;
a plurality of casings, each casing made of a non-woven polymer fleece material and surrounding substantially an entire circumference of a corresponding one of the perforated tubes along at least a portion of a length of the corresponding tube;
a web system consisting of non-woven polymer fleece material positioned entirely above or entirely below each of the one or more perforated tubes and plurality of casings; and
at least one attachment, a first portion of each attachment connected to the web system and a second portion of each attachment connected to one of the plurality of casings and securing the casing to the web so that the casing extends across the web and so that the tubes extend in a spaced apart fashion.

17. The irrigation mat of claim 16, wherein the non-woven polymer fleece material is planar when the subsurface irrigation mat set upon a flat surface.

\* \* \* \* \*

UNITED STATES PATENT AND TRADEMARK OFFICE
CERTIFICATE OF CORRECTION

PATENT NO. : 9,668,432 B2  
APPLICATION NO. : 13/627707  
DATED : June 6, 2017  
INVENTOR(S) : Thomas Heinrich Roess et al.

Page 1 of 1

It is certified that error appears in the above-identified patent and that said Letters Patent is hereby corrected as shown below:

In the Specification

In Column 5 at Line 35, Change "Aaalbord," to -- Aalbord,--.

In the Claims

In Column 9 at Line 1, In Claim 15, change "mate" to --mat--.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*